US 8,646,062 B2

(12) United States Patent
Bouz et al.

(10) Patent No.: US 8,646,062 B2
(45) Date of Patent: Feb. 4, 2014

(54) REMOTE AUTHENTICATION BASED ON CHALLENGE-RESPONSE USING DIGITAL CERTIFICATES

(75) Inventors: Firas Bouz, Lexington, KY (US); Terry D. Escamilla, Lafayette, CO (US); Hugo M. Krawczyk, Tarrytown, NY (US); Tal D. Rabin, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 12/942,187

(22) Filed: Nov. 9, 2010

(65) Prior Publication Data

US 2012/0117639 A1    May 10, 2012

(51) Int. Cl.
*H04L 29/06* (2006.01)
(52) U.S. Cl.
USPC ........ 726/10; 726/8; 726/9; 726/28; 713/150; 713/156; 713/159; 713/168; 713/172; 713/173; 713/176; 713/185
(58) Field of Classification Search
USPC .......... 726/8–10, 28; 713/150, 156, 159, 168, 713/172, 173, 176, 185
See application file for complete search history.

(56) References Cited

U.S. PATENT DOCUMENTS

| | | | |
|---|---|---|---|
| 6,609,198 B1 * | 8/2003 | Wood et al. | 713/155 |
| 7,100,195 B1 * | 8/2006 | Underwood | 726/2 |
| 7,210,037 B2 | 4/2007 | Samar | |
| 7,360,096 B2 * | 4/2008 | Bracewell et al. | 713/183 |
| 8,078,866 B2 * | 12/2011 | Xiao | 713/157 |
| 2003/0023845 A1 * | 1/2003 | VanHeyningen | 713/151 |
| 2006/0026421 A1 | 2/2006 | Gasparini et al. | |
| 2006/0294366 A1 * | 12/2006 | Nadalin et al. | 713/156 |
| 2009/0100263 A1 | 4/2009 | Leonard | |
| 2009/0222887 A1 | 9/2009 | Cohen | |

* cited by examiner

*Primary Examiner* — Harunur Rashid
*Assistant Examiner* — Gary Lavelle
(74) *Attorney, Agent, or Firm* — Patrick J. Daugherty; Driggs, Hogg, Daugherty, Del Zoppo Co., LPA

(57) ABSTRACT

Embodiments of the invention provide for authenticating users of web-based applications by presenting a previously acquired signed digital signature. Examples establish secure user sessions between a client and a user in response to a verification of an identification of the user by the client, the client creating a unique username for the user and unlocking access by the user to a client digital signature for use with a request for service from a third party web server. A secure facilitator session is established between the client and a third party web server, wherein messages exchanged with the unique username and a unique session identification indicia of the secure facilitator session signed by the unlocked digital signature result in executed processes requested by the service identifier data if the messages are validated without the client requiring the user to verify user identification for any message until a secure facilitator session ends.

18 Claims, 3 Drawing Sheets

REMOTE AUTHENTICATION BASED ON CHALLENGE-RESPONSE USING DIGITAL CERTIFICATES

BACKGROUND

The present invention relates to authenticating users of web-based applications, and more particularly to presenting unique information that distinctly identifies and validates a user.

The use of cryptographic tokens may eliminate the need for users to enter a password into a secure access interface during every information request or entry attempt. More particularly, presenting a unique set of information that distinctly identifies a user (i.e. a user name and a password) or a token (hardware or software) to prove who they claim to be may obviate a need for additional active authorization by the user by entering a password, correctly answering a challenge question, etc. However, the use of such cryptographic tokens requires proper implementation, and thus reentry of passwords and other authorization verification steps are still commonly required with respect to subsequent access attempts by a user.

BRIEF SUMMARY

In one embodiment, a method is provided for authenticating users of web-based applications by presenting a previously acquired signed digital signature. Steps include establishing a secure user session between a client and a user in response to a verification of an identification of the user by the client, wherein the client creates a unique username for the user and unlocks access by the user to a client digital signature for use with a request for service from a third party web server. A secure facilitator session is accordingly established between the client and a third party web server, wherein the client sends a session establishment message with the unique username to the third party web server. The third party web server replies with a challenge message that has the unique username and a unique session identification indicia of the secure facilitator session. The client in turn replies with a request message that has identifier data indicating a service requested by the user for execution by the third party web server and the unique session identification indicia, each signed by the unlocked digital signature. In response to the request message, the server validates the client's digital signature on the service identifier data and the unique session identification indicia, and if the client's digital signature thereon is validated and the secure facilitator session has not timed out, executes a process requested by the service identifier data and displays results of the process to the client. Further, the client may repetitively send additional request messages having identifier data indicating additional services requested by the user for execution by the third party web server and the unique session identification indicia, each signed by the unlocked digital signature, and receive displays of results of processes executed by the third party web server in response to validated requests without the client requiring the user to verify the user identification for any of the additional request messages until the secure facilitator session ends.

In another embodiment, a computer system includes a processing unit, computer readable memory and a computer readable storage system. Program instructions on the computer readable storage system cause the processing unit to establish a secure user session between a client and a user in response to a verification of an identification of the user by the client, wherein the client creates a unique username for the user and unlocks access by the user to a client digital signature for use with a request for service from a third party web server. A secure facilitator session is accordingly established between the client and a third party web server, wherein the client sends a session establishment message with the unique username to the third party web server. The third party web server replies with a challenge message that has the unique username and a unique session identification indicia of the secure facilitator session. The client in turn replies with a request message that has identifier data indicating a service requested by the user for execution by the third party web server and the unique session identification indicia, each signed by the unlocked digital signature. In response to the request message, the server validates the client's digital signature on the service identifier data and the unique session identification indicia, and if the client's digital signature thereon is validated and the secure facilitator session has not timed out, executes a process requested by the service identifier data and displays results of the process to the client. Further, the client may repetitively send additional request messages having identifier data indicating additional services requested by the user for execution by the third party web server and the unique session identification indicia, each signed by the unlocked digital signature, and receive displays of results of processes executed by the third party web server in response to validated requests without the client requiring the user to verify the user identification for any of the additional request messages until the secure facilitator session ends.

In another embodiment, a computer program product includes program instructions to establish a secure user session between a client and a user in response to a verification of an identification of the user by the client, wherein the client creates a unique username for the user and unlocks access by the user to a client digital signature for use with a request for service from a third party web server. A secure facilitator session is accordingly established between the client and a third party web server, wherein the client sends a session establishment message with the unique username to the third party web server. The third party web server replies with a challenge message that has the unique username and a unique session identification indicia of the secure facilitator session. The client in turn replies with a request message that has identifier data indicating a service requested by the user for execution by the third party web server and the unique session identification indicia, each signed by the unlocked digital signature. In response to the request message, the server validates the client's digital signature on the service identifier data and the unique session identification indicia, and if the client's digital signature thereon is validated and the secure facilitator session has not timed out, executes a process requested by the service identifier data and displays results of the process to the client. Further, the client may repetitively send additional request messages having identifier data indicating additional services requested by the user for execution by the third party web server and the unique session identification indicia, each signed by the unlocked digital signature, and receive displays of results of processes executed by the third party web server in response to validated requests without the client requiring the user to verify the user identification for any of the additional request messages until the secure facilitator session ends.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
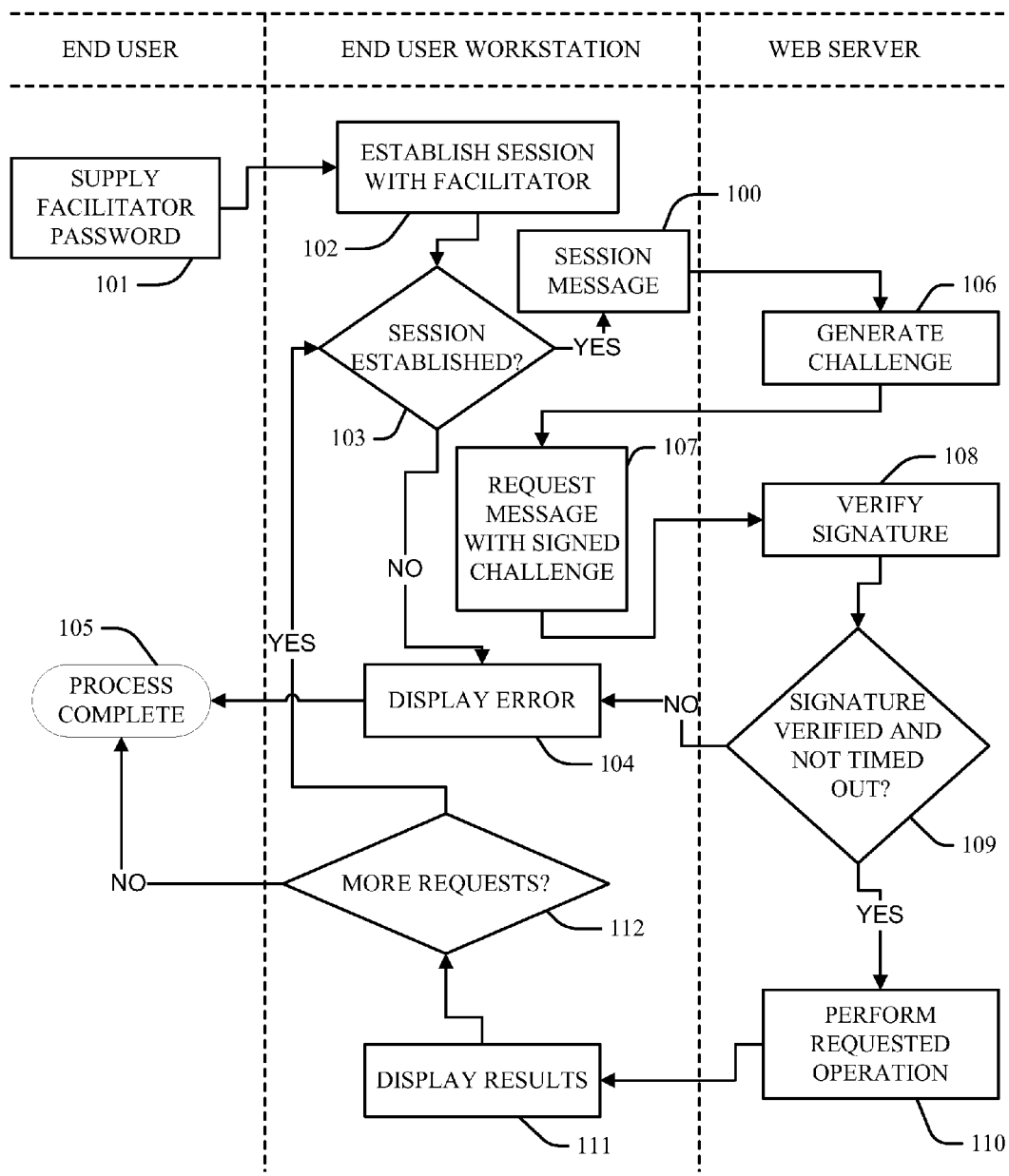
FIG. 1 illustrates an embodiment of a system authenticating users of web-based applications by presenting a previously acquired signed digital signature according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an embodiment of a method or system according to the present invention is illustrated for authenticating users of web-based applications by presenting a previously acquired signed digital signature. At 101 an end user provides a password or other token or process to verify identity and status to a client, and in response the client establishes a secure session with the client at 102, wherein the client serves as a facilitator on behalf of the user in establishing a secure session with the server. Thus, one or more user requests for service may be relayed for satisfaction by the server without requiring the user to reestablish the secure session for each separate request. More particularly, the client prompts the user for appropriate credentials to enable the client to function as a facilitator and to unlock access to the facilitator's digital certificate or signature for use with the third party web service through Secure Sockets Layer (SSL) client-server communications.

If the appropriate facilitator status is established at 102 as determined at 103 then the client creates and sends a session establishment message (i.e., a "HELLO" message) at 100 to the web server to establish a session with the server and thereby facilitate servicing the user request(s) by the third party server. This message comprises data identifying its type (i.e. that this is a session establishment message) and also a unique username of the user, one distinguished from other user names and managed by the facilitator to function as a claimed identity of the user submitting the request and other data described more fully below. Otherwise, if the appropriate facilitator status is not established at 103, then the client displays an error message to the user at 104 and terminates the process at 105.

In response to said "HELLO" message, the web server generates and replies with a challenge message (i.e. a "HELLO_ACK" message) at 106 which includes a unique session identification indicia (ID). At 107 the client replies with a signed reply message requesting a desired process or service (i.e. a "REQ" message) which includes the session ID it received from the server in the "HELLO_ACK" challenge message, and also an identifier indicating a service that the client wants the server to execute (i.e. a "REQ_TYP" identifier). Each of the fields containing the session ID and the message data are signed using the client's digital signature as provided by the facilitator at the establishment of the session at 102/103. More particularly, the signature is extracted from the client and signifies the secure status connection of the client, the client thereby facilitating the user request as if the user request is sent by the client instead of by the user, wherein the message may be received and processed by the web server as if it is being used within the client/facilitator's context.

At 108 the server validates the client's digital signature on the response data, and if the signature is verified and the session has not timed out, then at 109 the server then executes the process requested by the REQ_TYP message at 110. Otherwise, if the session times out or the signature is not verified, then at 109 the client displays the error message to the user at 104 and terminates the process at 105.

The results of the requested process are provided to the client at 111, wherein the client may repeat the above process for more requests at 122 through the established/facilitated session with the server at 103 until finished and the client ends the session at 105 wherein the server closes the established/facilitated session.

Elements 101 and 105 of the process/system of FIG. 1 are within the end user's domain; elements 102, 103, 104, 107, 111 and 112 are within the domain of the end user workstation; and elements 106, 108, 109 and 110 are within the domain of a web server. Further, elements 101 and 105 are end user processes; elements 102, 104, 106, 109, 110, 111 and 112 are authenticator client processes; and elements 103, 107 and 108 are facilitator processes. It will be noted that the above protocol can enforce a specific sequence of events, if desirable. For example, if either client or server receives a message out of sequence, then the session is (or is recommended to be) terminated. Further, all service request calls from the client must be preceded by the authentication call 103 to the server.

Figure 2:
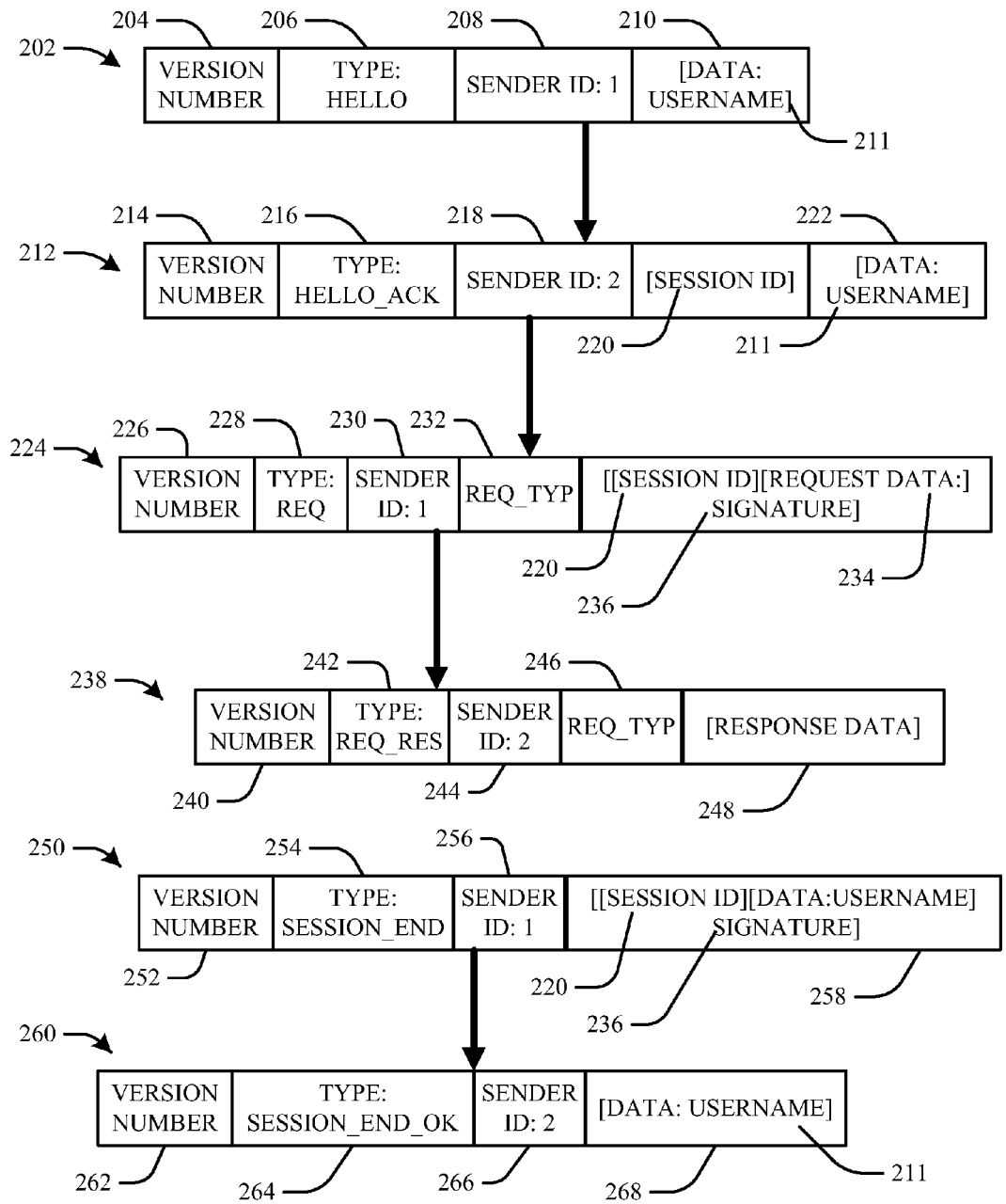
FIG. 2 is a computerized implementation of an embodiment of the present invention.

FIG. 2 illustrates the fields of some exemplary embodiments of the messages exchange in the process of FIG. 1, though it will be understood that other examples may use different formats. More particularly, the client sends a HELLO message 202 from the established session to the server at 103 comprising: (1) a Message version number 204; (2) a Message type ("HELLO") 206; (3) a Sender ID [1=client] 208; and (4) Message data 210 including the unique username 211 as managed by the client as facilitator.

In response to the HELLO message 202, the server replies with the HELLO_ACK challenge message 212 at 106, which comprises: (1) a Message version number 214; (2) a Message type ("HELLO_ACK") 216; (3) a Sender ID [2=server] 218; (4) a Unique Session ID 220 provided by the server; and (5) message data 222 including the unique username.

In response to the HELLO_ACK challenge message 212, the client replies with the signed challenge REQ message 224 at 107, which comprises: (1) a Message version number 226; (2) a Message type ("REQ") 228; (3) a Sender ID [1=client] 230; (4) a request type REQ_TYP 232, one of a predefined list of permissible requests; (5) the Unique Session ID 220; (6) message-specific Request data 234, for example for custom query, etc.; and (7) a digital signature 236 on the (5) Unique Session ID 220 and (6) message-specific Request data 234 fields, wherein the digital signature is extracted from the client and signifies the secure status connection of the client/facilitator context.

In response to the signed challenge REQ message 224, the server checks the signature of the client in the verification steps 108-109, and if the signature is validated and the session has not timed out, the server performs the process sought by the user at 110 (the request type REQ_TYP 232) and replies with the results at 111, with the received requested process REQ_RES message 238 comprising (1) a Message version number 240; (2) a Message type ("REQ_RES") 242; (3) the sender ID [2=server] 244; (4) a response type field RES_TYP 246 which specifies whatever type of message that the present message is in response to; and (5) response-data 248 based on the REQ_TYP 246 data.

As discussed above, in response to receiving the REQ_RES message 242, the client can repeatedly send another REQ message 224 and subsequently receive a corresponding REQ_RES 242 for each iteration until the session is ended. The client may end the session by sending a SESSION_END message 250 at 107 comprising: (1) a Message version number 252; (2) a session end message type ("SESSION_END") 254; (3) a sender ID [1=client] 256; (4) the Unique Session ID 220; (5) Message data 258 including the unique username 211; and (6) the digital signature 236 on the (4) Unique Session ID 220 and the (5) Message data 258 fields. The session end message 250 is acknowledged by the server with a SESSION_END_OK message 260 comprising (1) a Message version number 262; (2) a Message type ("SESSION_END_OK") 264; (3) the sender ID [2=server] 266; (4) and Message data 268 including the unique username 211. In response to this message, the client closes the connection and the server deletes the session and the process is complete at 105.

Embodiments of the present invention initiate a communication request with a remote server and then respond to its challenge using the client's digital signature, as obtained from a third party client application, also sometimes referred to as a facilitator, that is already extant and resident on the same client workstation. All client-server communication is assumed to take place over Secure Sockets Layer (SSL) or some other secure communications protocol.

The signed messages from the client to the server function as cryptographic tokens that may eliminate the need for users to enter a password into a secure access interface during every information request or entry attempt, and thus a user may send a plurality of additional requests before terminating a secure facilitator session. Embodiments rely on the use of a digital signature that has already been implemented by a separate, third party, client (facilitator) to eliminate the need for having to re-implement a cryptographic signature or ship one explicitly for each user (or client) who desires to take advantage of this feature. Instead, embodiments enable the client-facilitator to reuse existing ones in the context of authenticating a user to a remote server within an enterprise setting.

The present invention may be applied to numerous technologies that use cryptographic digital signatures to improve the user experience and productivity through allowing them to reuse existing credentials to establish authenticity, even when approaching systems from outside of a corporate firewall. Communication with the facilitator can take place at run time, on demand, programmatically to take advantage of existing functionality.

For example, embodiments may be practiced with mail clients wherein each user within the client enterprise is assigned a unique digital certificate that is used by the client to help recipients of communications from the user ensure authenticity of its origin. Lotus Notes® is one example of such a mail client, though other examples will be apparent to one skilled in the art. LOTUS NOTES is a trademark of the IBM Corporation in the United States or other countries. Thus, an existing digital certificate may be utilized outside the context of its original client application and for use in the context of secure web authentication, for example through SSL or other secure platforms and methods. The reuse of existing functionality in a new context eliminates the need for new development and deployment efforts and for the purposes of establishing the authenticity of claimed identifies, thus providing system efficiencies.

Client impersonation attempts through the reuse of the client's digital certification (for example, replay attacks, etc.) may be foiled through the inclusion of a UTC timestamp that is also signed using the client's digital certificate, much like other attributes of the client communications are. A UTC Time Stamp refers to Coordinated Universal Time or Temps Universal Coordonné and denotes a time in a 24-hour nomenclature derived from atomic time and using a Gregorian calendar date.

Abbreviation message type sequence enforcement can also assist in limiting the ability of a reply attack. More particularly, glossary model naming standards may be enforced wherein terms defined in a glossary must be used and term orders followed when naming a data object, and wherein a glossary model describes the terms that are established, approved, and shared in an organization for data object names, defining name, abbreviation, alternative abbreviation, type (prime or class), if it can be used as a modifier, status, and abstract or description for terms, etc. Accordingly, some embodiments further validate request messages at 108 of FIG. 1 by determining if the data signed by the client's digital signature complies with abbreviation message type sequence definitions, and if not failing the verification and ending the process/secure session at 109-104-105.

Embodiments may be implemented as a browser plug-in and as a Rich Client. A Rich Client Platform (RCP) is an implementation in computer hardware that builds on an existing platform, and it may be portable to many operating systems. Examples of RCP generally comprise a core (microkernel) lifecycle manager; a bundling framework; a portable widget toolkit; file buffers, text handling and text editors; a workbench (for example, views, editors, perspectives, wizards, etc.); data binding; and update manager components, though variations may be practiced as will be appreciated by one skilled in the art. By building on existing platforms, RCP's may benefit from the use of proven and tested features of a framework provided by the platform, as well as providing for faster application development and integration compared with building an application from scratch. Further, any cross-platform burden may be taken on by the platform developers. RCP examples for Java™ include the Eclipse™, NetBeans™ and Spring Framework™. JAVA and NETBEANS are trademarks of the Oracle Corporation in the United States or other countries. ECLIPSE is a trademark of the Eclipse Foundation in the United States or other countries. SPRING FRAMEWORK is a trademark of VMware in the United States or other countries.

Figure 3:
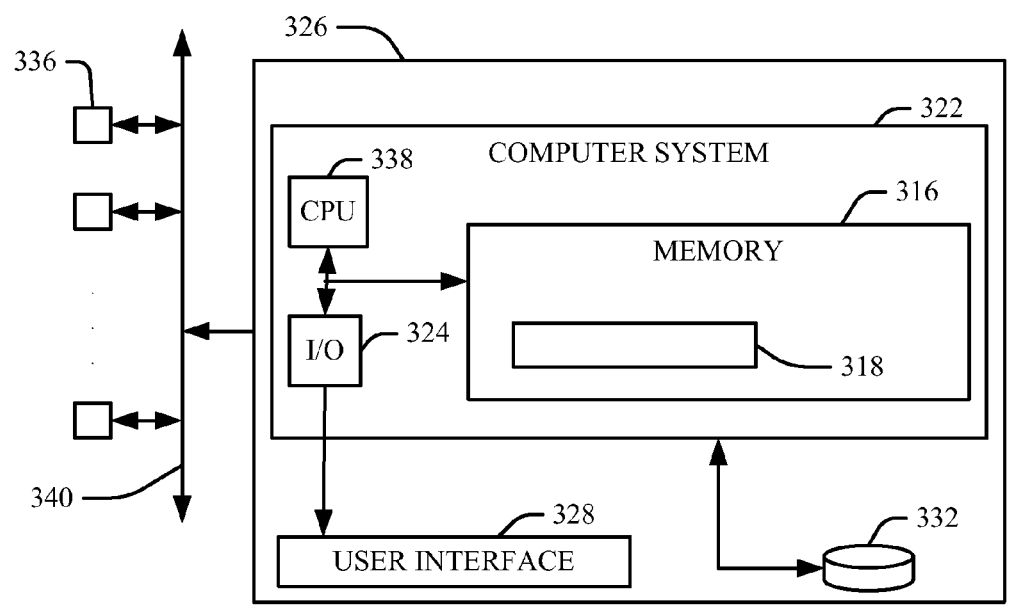

Referring now to FIG. 3, an exemplary computerized implementation of an embodiment of the present invention includes client computer or other programmable device 322 in communication with a user interface 328 and with one or more third party servers 336 accessible through an SSL or other secure web interface 340, for example in response to computer readable code 318 in a file residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external I/O devices/resources 324, user interfaces 328 and storage systems 332. In general, the processing unit 338 may execute computer program code, such as the code to implement one or more of the process steps illustrated in the Figures, which may be stored in the memory 316 and/or external storage system 332 or user interface device 328.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.), not shown, can be included in the computer 322.

One embodiment performs process steps of the invention on a subscription, advertising, and/or fee basis. That is, a service provider could offer to authenticate users of web-based applications to third party servers by presenting a previously acquired signed digital signature. In this case, the service provider can create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles to authenticate users of web-based applications to third party servers as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for authenticating users by presenting a previously acquired signed digital signature, the method comprising:

in response to receiving a facilitator password from a user that verifies an identity of the user, creating a unique username for the user, unlocking access by the user to a client digital signature for use with a request for service from a server, and establishing a secure facilitator session with the server by sending a session establishment message comprising an establishment message type identifier and the unique username to the server; and in response to receiving from the server, in reply to the session establishment message, a challenge message comprising the unique username, a challenge message type identifier that is different from the establishment message type identifier, and a unique secure facilitator session identification indicia, replying to the server with a request message comprising service type identifier indicating a service requested by the user for execution by the server and that is different from the challenge message type identifier and the establishment message type identifier, and the unique session identification indicia, wherein the service type identifier and the unique session identification indicia are signed by the unlocked digital signature; and wherein, in response to validating the digital signature on the service identifier and the unique session identification indicia within the request message and to determining that the established secure facilitator session has not timed out, the server, without requiring the user to provide the facilitator password with the request message, executes a process requested by the service type identifier and provides results of the process in a response message; and sending an additional request message to the server comprising an additional service type identifier indicating an additional service that is requested by the user for execution by the server, wherein the additional service type identifier is different from the challenge message type identifier and the establishment message type identifier and is signed with the unique session identification indicia by the unlocked digital signature; and wherein, in response to validating the unlocked digital signature on the additional service type identifier and the unique session identification indicia within the additional request messages and to determining that the established secure facilitator session has not timed out, the server, without requiring the user to provide the facilitator password with the additional request message, executes an additional process requested by the additional service type identifier and provides results of the additional process in an additional response message.

2. The method of claim 1, further comprising:
ending the established secure facilitator session by sending a session end message comprising session end instruction data and the unique session identification indicia, wherein the session end instruction data and the unique session identification indicia are signed by the unlocked digital signature.

3. The method of claim 1, further comprising exchanging each of the session establishment message, the challenge message, the request message, the response message, the additional request message and the additional response message through Secure Sockets Layer client-server communications.

4. The method of claim 1, further comprising:
terminating the established secure facilitator session in response to receiving any of the session establishment message, the challenge message, the request message, the response message, the additional request message and the additional response message out of a responsive sequence.

5. The method of claim 1, wherein the step of executing the process requested by the service type identifier and providing the results of the process in the response message further comprises:
executing the process requested by the service type identifier and displaying the results of the process to the client if a service request call from the client is preceded by an authentication call to the server.

6. The method of claim 1, wherein the request message in response to the challenge message further comprises a coordinated universal time timestamp that is signed by the unlocked digital signature; and
wherein the server executes the process requested by the service type identifier in response to the request message and provides the results of the process in the response message in response to determining that the established secure facilitator session has not timed out as a function of the coordinated universal time timestamp signed by the unlocked digital signature.

7. The method of claim 1, further comprising:
continuing the established secure facilitator session if data of the request message that is signed by the unlocked digital signature complies with an abbreviation message type sequence definition; otherwise ending the established secure facilitator session.

8. The method of claim 1, further comprising:
integrating computer-readable program code into a computer system comprising a processing unit, wherein the computer readable program code when executed by the processing unit cause the processing unit to perform the steps of
creating the unique username, unlocking access to the client digital signature, establishing the secure facilitator session, replying to the server with the request message and sending the additional request message to the server.

9. A system, comprising:
a processing unit in communication with a computer readable memory device and a tangible computer-readable storage medium;
wherein the processing unit, when executing program instructions stored on the tangible computer-readable storage medium via the computer readable memory device:
in response to receiving a facilitator password from a user that verifies an identity of the user, creates a unique username for the user, unlocks access by the user to a client digital signature for use with a request for service from a server, and establishes a secure facilitator session with the server by sending a session establishment message comprising an establishment message type identifier and the unique username to the server; and
in response to receiving from the server, in reply to the session establishment message, a challenge message comprising the unique username, a challenge message type identifier that is different from the establishment message type identifier, and a unique secure facilitator session identification indicia, replies to the server with a request message comprising service type identifier indicating a service requested by the user for execution by the server and that is different from the challenge message type identifier and the establishment message type identifier, and the unique session identification indicia, wherein the service type identifier and the unique session identification indicia are signed by the unlocked digital signature;
wherein, in response to validating the digital signature on the service identifier and the unique session identification indicia within the request message and to determining that the established secure facilitator session has not timed out, the server, without requiring the user to provide the facilitator password with the request message, executes a process requested by the service type identifier and provides results of the process in a response message; and
sends an additional request message to the server comprising an additional service type identifier indicating an additional service that is requested by the user for execution by the server, wherein the additional service type identifier is different from the challenge message type identifier and the establishment message type identifier and is signed with the unique session identification indicia by the unlocked digital signature; and
wherein, in response to validating the digital signature on the additional service type identifier and the unique session identification indicia within the additional request message and to determining that the established secure facilitator session has not timed out, the server, without requiring the user to provide the facilitator password with the additional request message, executes an additional process requested by the additional service type identifier and provides results of the additional process in an additional response message.

10. The system of claim 9, wherein the processing unit, when executing the program instructions stored on the computer-readable storage medium via the computer readable memory device, ends the established secure facilitator session by sending a session end message comprising session end instruction data and the unique session identification indicia, wherein the session end instruction data and the unique session identification indicia are signed by the unlocked digital signature.

11. The system of claim 9, wherein the processing unit, when executing the program instructions stored on the computer-readable storage medium via the computer readable memory device, exchanges each of the session establishment message, the challenge message, the request message, the response message, the additional request message and the additional response message with the server through secure sockets layer client-server communications.

12. The system of claim 9, wherein the processing unit, when executing the program instructions stored on the computer-readable storage medium via the computer readable memory device, further terminates the established secure facilitator session in response to receiving any of the challenge message, the response message, and the additional response message out of a responsive sequence.

13. The system of claim 9, wherein the processing unit, when executing the program instructions stored on the computer-readable storage medium via the computer readable memory device, sends the request message in response to the challenge message by including a coordinated universal time timestamp that is signed by the unlocked digital signature; and wherein the server executes the process requested by the service type identifier in response to the request message and provides the results of the process in the response message in response to determining that the established secure facilitator session has not timed out as a function of the coordinated universal time timestamp signed by the unlocked digital signature.

14. A computer program product for authenticating users by presenting a previously acquired signed digital signature, the computer program product comprising:

a computer readable tangible storage medium that is not a signal medium and has computer readable program code embodied therewith, the computer readable program code comprising instructions that, when executed by a computer processing unit, cause the computer processing unit to:

in response to receiving a facilitator password from a user that verifies an identity of the user, create a unique username for the user, unlock access by the user to a client digital signature for use with a request for service from a server, and establish a secure facilitator session with the server by sending a session establishment message comprising an establishment message type identifier and the unique username to the server; and in response to receiving from the server, in reply to the session establishment message, a challenge message comprising the unique username, a challenge message type identifier that is different from the establishment message type identifier, and a unique secure facilitator session identification indicia, reply to the server with a request message comprising service type identifier indicating a service requested by the user for execution by the server and that is different from the challenge message type identifier and the establishment message type identifier, and the unique session identification indicia, wherein the service type identifier and the unique session identification indicia are signed by the unlocked digital signature;

wherein, in response to the request message, the server executes a process requested by the service type identifier and provides results of the process in a response message, in response to validating the unlocked digital signature signed on the service type identifier and the unique session identification indicia without requiring the user to provide the facilitator password with the request message, and in response to determining that the established secure facilitator session has not timed out; and send an additional request message to the server comprising an additional service type identifier indicating an additional service that is requested by the user for execution by the server, wherein the additional service type identifier is different from the challenge message type identifier and the establishment message type identifier and is signed with the unique session identification indicia by the unlocked digital signature; and wherein, in response to the additional request message, the server executes an additional process requested by the additional service type identifier and provides results of the additional process in an additional response message, in response to validating the unlocked digital signature signed on the additional service type identifier and the unique session identification indicia of the additional request message without requiring the user to provide the facilitator password with the additional request message, and in response to determining that the established secure facilitator session has not timed out.

15. The computer program product of claim 14, wherein the computer readable program code instructions, when executed by the computer processing unit, further cause the computer processing unit to end the established secure facilitator session by sending a session end message comprising session end instruction data and the unique session identification indicia, wherein the session end instruction data and the unique session identification indicia are signed by the unlocked digital signature.

16. The computer program product of claim 14, wherein the computer readable program code instructions, when executed by the computer processing unit, further cause the computer processing unit to exchange each of the session establishment message, the challenge message, the request message, the response message, the additional request message and the additional response message with the server through secure sockets layer client-server communications.

17. The computer program product of claim 14, wherein the computer readable program code instructions, when executed by the computer processing unit, further cause the computer processing unit to terminate the established secure facilitator session in response to receiving any of the challenge message, the response message, and the additional response message out of a responsive sequence.

18. The computer program product of claim 14, wherein the computer readable program code, instructions, when executed by the computer processing unit, further cause the computer processing unit to send the request message in response to the challenge message by including a coordinated universal time timestamp that is signed by the unlocked digital signature; and wherein the server executes the process requested by the service type identifier in response to the request message and provides the results of the process in the response message in response to determining that the established secure facilitator session has not timed out as a function of the coordinated universal time timestamp signed by the unlocked digital signature.

* * * * *